(12) United States Patent
Yanagita

(10) Patent No.: US 6,606,819 B2
(45) Date of Patent: Aug. 19, 2003

(54) MODIFYING REAGENTS AND MODIFIED ORGANIC MEDIA FOR PLANT CULTURE

(75) Inventor: Tomotaka Yanagita, Tokyo (JP)

(73) Assignee: Createrra Inc., Tokyo (JP)

( * ) Notice: Subject to any disclaimer, the term of this patent is extended or adjusted under 35 U.S.C. 154(b) by 141 days.

(21) Appl. No.: 09/829,612

(22) Filed: Apr. 10, 2001

(65) Prior Publication Data

US 2001/0015083 A1 Aug. 23, 2001

Related U.S. Application Data

(63) Continuation-in-part of application No. 09/295,930, filed on Apr. 21, 1999, now abandoned.

(30) Foreign Application Priority Data

Apr. 24, 1998 (JP) ............................................. 10-129720

(51) Int. Cl.⁷ .............................. A01G 1/00; C05F 11/00
(52) U.S. Cl. ............................... 47/1.01 F; 47/DIG. 10; 71/11; 71/23
(58) Field of Search ........................... 71/11, 6, 31, 23; 47/1.01 R, 1.01 F, DIG. 10

(56) References Cited

U.S. PATENT DOCUMENTS 3,828,470 A * 8/1974 Stoller ............................. 71/5
5,458,662 A * 10/1995 Toyone ................... 47/DIG. 10

FOREIGN PATENT DOCUMENTS

| EP | 0952201 | * | 10/1999 | |
| JP | 53-002272 | * | 1/1978 | ...................... 71/5 |

* cited by examiner

Primary Examiner—Wayne A. Langel
(74) Attorney, Agent, or Firm—Jiawei Huang; J.C. Patents

(57) ABSTRACT

Organic media are derived from natural organic materials, which are coconut dust, simple coconut dust, or those containing coconut staple fibers, coconut pericarp chips, and are beaten bark, which is both broadleaf trees and needleleaf trees, and sawdust. These natural organic materials contain a lot of organic acids and salt (NaCl). The feature of the present invention is treatment using the modifying reagents to eliminate the organic acids and salt that adversely affect the cultivation of plants. The modifying reagents consist of at least one salt selected from among iron salts and aluminum salts, and the modified organic media obtained by modifying the natural organic materials with the modifying reagents. The natural organic materials are preferably coconut dusts, beaten bark, and sawdust. The modifying materials of 0.1 to 5 g is preferably applied to the natural organic materials of 100 g in dry weight.

3 Claims, No Drawings

MODIFYING REAGENTS AND MODIFIED ORGANIC MEDIA FOR PLANT CULTURE

This is a continuation-in-part of Ser. No. 09/295,930 filed Apr. 21, 1999 now abandoned.

BACKGROUND OF THE INVENTION

1. Field of the Invention

The present invention relates to modifying reagents and modified organic media treated hereby, and more particularly to modifying reagents for making natural organic materials into the modified organic media, which are appropriate for planting trees and flowers, and to modified organic media being made thereby to be used in the planting fields of civil engineering works such as agriculture, forestry, gardening, and landscape design.

2. Background Art

Conventionally, materials to be used for cultivating trees and flowers include peat moss, coconut dusts (simple coconut dust, and those containing coconut staple fibers or coconut pericarp chips), tuff loam aggregates, perlite, beaten bark, and sawdust.

Of these, coconut dusts, beaten bark, and sawdust are hard to be biodegraded despite of being organic, and have excellent properties such as low water-repellency in dried state and high water/fertilizer retention capacities, which no other natural organic material has. On this account, recently, large amount of these materials have been used as the organic media for plant culture.

However, the natural organic materials obtained from the coconut dusts and the beaten bark contain a lot of salt (NaCl), which adversely affects the cultivation of plants. In order to remove the contained salt, the coconut dusts require some treatment of being exposed outdoor over a long period, e.g., 5 to 10 years, or immersed in water. Therefore, the preparation of the appropriate natural organic media take quite long time, leading to a limit in amount of supply.

Meanwhile, in addition to the aforesaid salt, the natural organic materials obtained from the coconut dusts, beaten bark and sawdust contain a large amount of organic acids such as phenolic acids, which also adversely affect the cultivation of plants. Especially, untreated coconut dusts with in about one to two years after harvest contain a great quantity of organic acids, and are inappropriate for the natural organic materials for cultivating plants. As well as the aforesaid salt, the organic acids can be removed by treatment of the long-term exposure or the water-immersing. However, there lies a problem of the same sort as in the salt.

Besides, an increase in demanded amount of the natural organic materials obtained from the coconut dusts, beaten bark and sawdust produces a problem of a decreasing supply of long-term-exposed coconut dusts. On this account, it has been desired to prepare new organic media from a large stock of untreated coconut dusts by some simple treatment without the long-term exposure.

The coconut dusts to be used in the present invention are harder to be biodegraded than peat moss that is known as the hardest material to be biodegraded among natural organic materials. The biodegradation of the natural organic materials by microorganisms causes nitrogen starvation or development of reduction state inside the natural organic materials themselves; therefore, additional lowering of the biodegradability is required. Note that, in the present invention, coconut dusts used is both simple coconut dust, and those containing coconut staple fibers or coconut pericarp chips.

SUMMARY OF THE INVENTION

In view of the foregoing problems, an object of the present invention is to provide modifying reagents for treating the natural organic materials obtained from coconut dusts, beaten bark and sawdust, which are capable of changing the organic media so as to prevent the adverse effects on the cultivation of plants. Note that, in the present invention, the beaten barks mean barks of both broadleaf trees and needleleaf trees.

Another object of the present invention is to provide the modifying reagents for decreasing the biodegradability of the natural organic materials obtained from the coconut dusts, beaten bark and sawdust. In other words the modified organic media of the present invention are substantially not microbially decomposed.

Besides, still another object of the present invention is to provide the modified organic media prepared from coconut dusts, beaten bark, sawdust by the aforesaid modifying reagents.

As an aspect of the present invention, the modifying reagents comprises at least one salt selected from among iron salts and aluminum salts. Here, the organic materials to be treated with the modifying reagents are preferably coconut dusts, beaten bark, and sawdust.

By means of the modifying reagents the organic acids contained in the coconut dusts are chemically reacted with the Fe and/or Al ions in the reagents to become insoluble, thereby enabling the removal of the obstacles to the cultivation of plants. At the same time, the biodegradability of the natural organic materials is remarkably suppressed; that is to say, the modified organic media are substantially not microbially decomposed.

Besides, the cations of the modifying reagents seem to have displacing effect on the sodium salt, which hampers the cultivation of plants, to promote desalting.

As another aspect of the present invention, the modified organic media are provided by treating the natural organic materials with the modifying reagents containing at least one salt selected from among the iron salts and the aluminum salts. Here, the organic materials are preferably coconut dusts, beaten bark, and sawdust.

Treatment using the modifying reagents of the present invention eliminate obstacles to the cultivation of plants even in the untreated coconut dusts. Here, well-balanced nutrients can be added to obtain modified organic media well suitable for cultivating plants.

DETAILED DESCRIPTION OF THE PREFERRED EMBODIMENTS

Reagents for treating natural organic materials according to the present invention (called ["modifying reagents"]) comprises at least one type of metallic salt. The metallic salt is selected from among iron salts and aluminum salts. Any one of these salts may be used alone, or in combination. In the present invention, iron salts are preferably used since the resulting modified organic media treated thereby are wider in usable pH range.

Examples of the aforesaid iron salt are ferrous sulfate, ferric sulfate, ferrous chloride, ferric chloride, ferrous nitrate, ferric nitrate, and mixtures thereof. Examples of the aluminum salts are aluminum sulfate, aluminum chloride, and mixtures thereof. Of these, ferrous sulfate and ferric sulfate are preferable. Ferrous sulfate is the most preferable.

Natural organic materials can be treated with the aforesaid modifying reagents to be changed into modified organic media according to the present invention. The natural organic materials in the present invention are preferably obtained from coconut dusts (simple coconut dust, or those containing coconut staple fibers, coconut pericarp chips), beaten bark, sawdust. As for bark, that of both broadleaf trees and needleleaf trees may be treated by the aforesaid modifying reagents into the modified organic media of the present invention. Besides, the modifying reagents of the present invention can be effective for previously desalted natural organic materials also. Note that, in the present invention, untreated coconut dust means the organic acid rich and non-desalted coconut dust left less than one to two years or so after harvest.

In treating natural organic materials with the modifying reagents of the present invention, the modifying reagents of any form can be used for the treatment. In view of simple treatment processes, that in the form of aqueous solution or powder is preferably used.

The modifying reagents of the present invention range in an applied amount of preferably from 0.1 to 5.0 g, more preferably from 0.3 to 2.0 g, and the most preferably from 0.37 to 0.50 g for 100 g (in dry weight) of the organic materials. At amounts of application smaller than 0.1 g, the modifying reagents change the organic materials incompletely. On the other hand, at amounts of application greater than 5.0 g, the modifying reagents easily causes phosphorous deficiency in the organic media, which is also unpreferable.

In the form of aqueous solution, the modifying reagents is preferably used at a concentration of from 0.04 to 5% by weight, more preferably from 0.04 to 2% by weight, and the most preferably from 0.06 to 0.2% by weight.

In using the powder of the modifying reagents, an appropriate amount of water is preferably added before, after, or in mixing. The amount of water to be added is not less than 100 ml, and preferably 200 to 300 ml for 100 g of the natural organic materials (in dry weight).

The modified organic media are prepared by a few processes; the desalting process, the modifying reagents adding process, the mixing process, the water adding process, the leaving process, and the compressing process. The modifying reagents may be applied in any of these processes except the compressing process, and is preferably applied before the mixing process. The processes before the mixing process may be performed simultaneously. The desalting process may be omitted.

In the modified organic media of the present invention, plants can be cultivated in the same way as in any conventionally-used organic media. Therefore, conventionally-used additives such as any other natural organic fertilizers and chemical fertilizers may be added to the modified organic media of the present invention.

[EXAMPLES]

Hereinafter, the present invention will be described in more detail in connection with examples thereof. It should be noted that the present invention is not limited thereto.

[Example 1]

Untreated and non-desalted coconut dusts (15% in water content) were used as the material. Five hundred grammes of the coconut dusts was mixed with 18.9 g of (powder) ferrous sulfate. After 1400 ml of water was added, the mixture was stirred, and left for three days at room temperature to obtain coconut dust-modified organic media.

[Example 2]

Untreated coconut dusts (15% in water content) were desalted by adding water of three times in volume and by compressing, Five hundred grammes (in dry weight) of the coconut dusts was mixed with 18.9 g of (powder) ferrous sulfate. After 1660 ml of water was added, the mixture was stirred, and left for three days at room temperature to obtain coconut dust-modified organic media.

[Example 3]

Untreated coconut dusts were heaped up and exposed outdoor for about 10 years so as to be desalted by rain, and the resulting coconut dusts were used as the material. Five hundred grammes of the coconut dusts (15% in water content) was mixed with 18.9 g of (powder) ferrous sulfate. After 1400 ml of water was added, the mixture was stirred, and left for three days at room temperature to obtain coconut dust-modified organic media.

[Example 4]

The coconut dust-modified organic media were obtained by the same processes as in the example 2 except in that the ferrous sulfate is substituted by 14.3 g of aluminum sulfate.

[Comparative examples 1 to 3]

For comparison, the coconut dusts used in the examples 1 to 3 were used without being treated by the modifying reagents of the present invention.

[Evaluation Test]

Measurements are made on the extracted amounts of phenolic acids (gallic acid, protocatechuic acid, p-hydroxybenzoic acid, vanillic acid, caffeic acid, syringic acid, p-coumalic acid, ferulic acid) contained in the above-obtained coconut dust modified organic medium of the present invention and the untreated coconut dust of the comparative examples. The phenolic acids are measured in conformity with the analytical method ("Analytical method for soil environment," published by Hakuyusha, (1997), pp.100–104). Table 1 shows the result of the measurements.

TABLE 1

| | Extracted amount of phenolic acids (mg/kg) |
|---|---|
| Example 1 | 1000.3 |
| Example 2 | 750.1 |
| Example 3 | 655.3 |
| Example 4 | 825.1 |
| Comparative example 1 | 10849.7 |
| Comparative example 2 | 8051.6 |
| Comparative example 3 | 5029.5 |

As shown in Table 1, the modified organic media of the examples 1, 2, 3, 4 are remarkably smaller than the corresponding comparative examples 1, 2, 3 in the extracted amount of phenolic acids, revealing that the treatment are successfully made to the natural organic materials.

This accordingly shows that the modifying reagents of the present invention provide excellent effects.

[Planting Test]

The coconut dust-modified organic media of the present invention obtained in the examples 1, 2, 3, and the untreated coconut dust of the comparative examples 1, 2, 3 were sampled in dry weight of 60 g, and filled into pots to obtain seedbeds. The seedbeds were planted with *Brassica rapa* ("Komatsuna" in Japanese) as the test plant for a plant cultivating test. The planting period thereof was one month. The cultivation results of the *Brassica rapa* (Komatsuna) were evaluated in weights (total dry weight, dry weight of above-ground parts, and dry weight of underground parts). Table 2 shows the results.

TABLE 2

| | Total dry weight (g/pot) | Dry weight of above-ground parts (g/pot) | Dry weight of underground parts (g/pot) |
|---|---|---|---|
| Example 1 | 21.62 | 12.03 | 9.59 |
| Example 2 | 24.47 | 13.62 | 10.85 |
| Example 3 | 26.37 | 14.67 | 11.70 |
| Comparative example 1 | 6.49 | 5.59 | 0.90 |
| Comparative example 2 | 8.63 | 7.34 | 1.29 |
| Comparative example 3 | 15.28 | 9.63 | 5.65 |

As shown in Table 2, the *Brassica rapa* (Komatsuna) planted in the modified organic media of the examples 1, 2, 3 is remarkably greater than those of the comparative examples 1, 2, 3 in dry weight in any parts. This accordingly shows that the obstacles to the cultivation of the plant are removed, and the modified organic media of the present invention are excellent.

Besides, by the treatment with the modifying reagents of the present invention, all of the untreated non-desalted coconut dusts, the desalted coconut dusts, and the coconut dusts exposed outdoors over a long period affect the *Brassica rapa* (Komatsuna) nearly equally. This shows that the treatment with modifying reagents of the present invention enables even untreated and non-desalted coconut dusts to be used as the organic media.

[Biodegradability Test]

In 100 ml vials, 10 g of soil was mixed with 0.3 g of respective coconut dust-organic media of the examples 1, 2, 3, 4 and of the comparative examples 1, 2, 3. Each of these was adjusted in water content to 50–60% of the maximum water holding capacity, and sealed with a rubber stopper. The vials were left in a thermostatic room at a temperature of 30° C. After 21 weeks, for each vial the amount of generated carbon dioxide was measured, which indicates the biodegradability thereof. Table 3 shows the obtained measurements.

TABLE 3

| | Amount of generated carbon dioxide ($CO_2$ mgC/100 g) |
|---|---|
| Example 1 | 405.45 |
| Example 2 | 356.23 |
| Example 3 | 394.42 |
| Example 4 | 416.52 |
| Comparative example 1 | 676.37 |
| Comparative example 2 | 587.65 |
| Comparative example 3 | 625.72 |

Table 3 clearly shows that the modified organic media according to the present invention are low in amount of generated carbon dioxide, and that the biodegradabilities thereof are lowered.

More especially, the modified organic media are substantially not microbially decomposed when the amount of $CO_2$-C(308 mg/100 g sample) contained in the blank vial is taken into account.

While some preferred embodiments of the present invention have been shown and described, it will be understood that the present invention is not limited thereto, and that various changes and modifications are possible by those skilled in the art without departing from the scope of the invention as set forth in the appended claims.

What is claimed is:

1. A modified organic compost for cultivating planting trees and flowers obtained by treating coconut dust with a modifying reagent containing at least one salt, in the amount from about 0.1 g to about 5 g per 100 g (in dry weight) of the coconut dust, selected from the group consisting of iron salts and aluminum salts which can chemically react with phenolic acids, wherein an extracted amount of the phenolic acids in the modified organic compost after the treatment is no more than 1000.3 mg/kg.

2. The modified organic compost of claim 1, wherein the coconut dust is untreated and undemineralized and no more than two years old after its harvest.

3. The modified organic compost of claim 1, wherein the biodegradability of the coconut dust is suppressed by the treatment.

* * * * *